Figure 1:
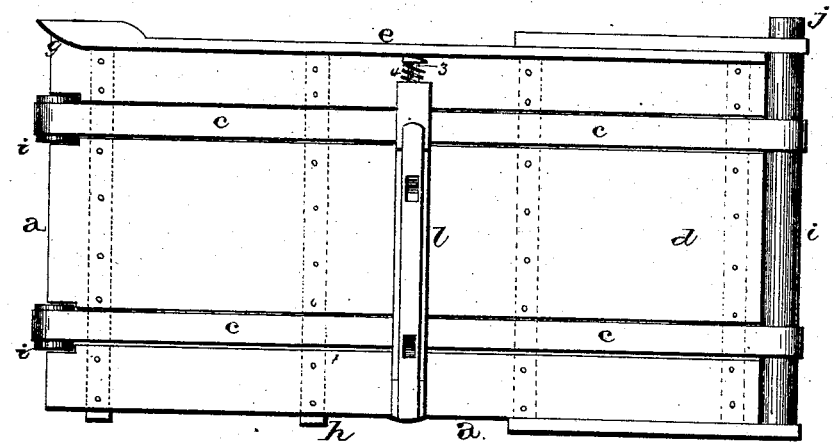
Figure 2:
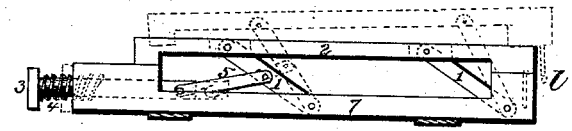

H. V. PECKENPAUGH & A. E. MILLER.
Harvester-Rakes.

No. 157,216.  Patented Nov. 24, 1874.

WITNESSES.

INVENTORS.

UNITED STATES PATENT OFFICE.

HARVEY V. PECKENPAUGH AND ABRAHAM E. MILLER, OF REEDER'S MILLS, IOWA.

IMPROVEMENT IN HARVESTER-RAKES.

Specification forming part of Letters Patent No. 157,216, dated November 24, 1874; application filed September 22, 1874.

*To all whom it may concern:*

Be it known that we, H. V. PECKENPAUGH and A. E. MILLER, of Reeder's Mills, in the county of Harrison and State of Iowa, have invented certain new and useful Improvements in Harvester-Rakes; and we do hereby declare the following to be a full, clear, and exact description of the invention, such as will enable others skilled in the art to which it pertains to make and use it, reference being had to the accompanying drawings, which form part of this specification.

Our invention relates to an improvement in harvester-rakes; and it consists in the arrangement and combination of devices, which will be more fully described hereafter.

The accompanying drawings represent our invention.

$a$ represents the platform, which consists of three longitudinal parallel sections bound together by suitable cross-bars, each section being separated from the other by a slot, which extends the full length of the platform and table, and in which slots play the endless belts $c$. To the outer end of the platform may be secured the extension-table $d$, by means of the rods that hold the elevator of the header, and along the rear side of both the platform and table is formed the back or flange $e$, the end of which is beveled away at the point $g$. This platform and table rests upon the cleats inside of the sickle-bar frame by means of the cross-bar $h$. At each end of the platform are placed suitable rollers $i$, around which pass the endless belts $c$, there being a pulley, $j$, placed upon one of the rollers, and around which passes an operating-belt from the driving-wheel of the header. Secured to the endless belts are one or more rakes, $l$, which extend across the platform, and, as they are moved along by the belts, they sweep the grain along and drop it upon the ground, out beyond one side of the machine. Pivoted to the top of the lower bar 7 of the rake are the two levers 1, which have their upper ends pivoted to the under side of the top bar 2, by which means the bar can be raised and lowered to a certain extent. Passing through the end of the lower bar of the rake is a rod, 3, having a beveled head, and between this head and the end of the bar is placed a spring, 4, which holds the rod pressed outward toward the back $e$. The inner end of this rod is attached, by means of the connecting-rod 5, to one of the levers 1, so that, when the rod is pressed inward or flies out, the top bar 2 will be moved also.

As the belts begin to move, and the rakes are drawn along up from the under side of the platform, the heads of the rods 3 strike against the bevel $g$, and are forced inward. As these rods are forced inward they raise the top bars 2 upward, so as to raise the height of the rake as it passes along over the top of the platform, and then, as soon as the rake reaches the end of the extension-table, the rod springs outward, and the top bar at once closes down as the rake passes down under the platform, so as to take up as little room as possible while passing through narrow places.

By increasing or decreasing the size of the driving-pulley, or by increasing the number of the rakes, the size of the bundles can be regulated at will.

Having thus described our invention, we claim—

1. The rake $l$, consisting of the bars 7 2, levers 1, rod 3, and spring 4, substantially as described.

2. The platform $a$, having the back or flange $e$, and provided with rollers, belts, and self-closing rake $l$, whereby the grain is made into bundles and deposited upon the ground at one side, substantially as specified.

In testimony that we claim the foregoing we have hereunto set our hands this 14th day of September, 1874.

HARVEY V. PECKENPAUGH.
  ABRAHAM E. MILLER.

Witnesses:
 THOMAS E. CAVIN,
 SILAS W. BROADWELL.